(12) United States Patent
Dobbins

(10) Patent No.: US 11,117,231 B2
(45) Date of Patent: Sep. 14, 2021

(54) FIXTURE FOR MACHINING PARTS AND METHOD OF USING SAME

(71) Applicant: Kaydon Ring & Seal, Inc., Baltimore, MD (US)

(72) Inventor: Gary Dobbins, Churchville, MD (US)

(73) Assignee: KAYDON RING & SEAL, INC., Baltimore, MD (US)

( * ) Notice: Subject to any disclaimer, the term of this patent is extended or adjusted under 35 U.S.C. 154(b) by 246 days.

(21) Appl. No.: 16/260,326

(22) Filed: Jan. 29, 2019

(65) Prior Publication Data

US 2020/0238457 A1     Jul. 30, 2020

(51) Int. Cl.
*B23Q 1/28*     (2006.01)
*B23Q 3/10*     (2006.01)

(52) U.S. Cl.
CPC ............... *B23Q 1/28* (2013.01); *B23Q 3/103* (2013.01)

(58) Field of Classification Search
CPC . B23Q 1/28; B23Q 1/03; B23Q 3/103; B23Q 3/062; B23Q 3/102; B23Q 3/105; B23B 31/021; B23B 31/19
USPC ................................ 269/101, 309; 408/115 R
See application file for complete search history.

(56) References Cited

U.S. PATENT DOCUMENTS

| 2,369,425 | A | * | 2/1945 | Becker | B23Q 3/103 269/85 |
| 3,175,820 | A | * | 3/1965 | Schiler | B23Q 1/25 269/296 |
| 4,164,076 | A | * | 8/1979 | Carrigan | B26D 7/2614 33/644 |
| 5,195,729 | A | * | 3/1993 | Thomas | H01L 21/67346 269/21 |

(Continued)

FOREIGN PATENT DOCUMENTS

| CN | 102091806 A | 6/2011 |
| CN | 202607338 U | 12/2012 |

(Continued)

OTHER PUBLICATIONS

Search report from the British Patent Office dated Apr. 28, 2020 in related application No. GB1917366.5.

*Primary Examiner* — Lee D Wilson
*Assistant Examiner* — Seahee Hong
(74) *Attorney, Agent, or Firm* — J-Tek Law PLLC; Scott T. Wakeman; Mark A. Ussai

(57) ABSTRACT

A machining fixture configured to secure a blank part having part inner and outer circumferential surfaces, a part first axial face opposing a part second axial face, and at least two threaded part openings extending inwardly from the part second axial face and toward the first axial face. The machining fixture includes an annular body sized to be disposable upon a pallet of a machine table and has an upper surface including a substantially flat annular surface section, (Continued)

opposing lower surface and at least two through-holes extending between the upper and lower surfaces. At least two fasteners are disposed at least partially within a separate one of the at least two through-holes such that the at least two fasteners project upwardly from the upper surface, and the at least two fasteners are configured to threadedly engage a separate one of the at least two part openings to removably clamp the part second face against the body flat surface section.

9 Claims, 8 Drawing Sheets

(56) References Cited

U.S. PATENT DOCUMENTS

| | | | | |
|---|---|---|---|---|
| 5,320,007 | A * | 6/1994 | Weirauch | B23Q 3/103 269/900 |
| 5,860,640 | A * | 1/1999 | Marohl | H01L 21/68742 269/289 R |
| 6,022,009 | A * | 2/2000 | Hill | B23Q 1/032 269/289 R |
| 2014/0312551 | A1 * | 10/2014 | Kress | B23Q 3/103 269/91 |

FOREIGN PATENT DOCUMENTS

| | | |
|---|---|---|
| CN | 205254600 U | 5/2016 |
| CN | 106736649 A | 5/2017 |
| CN | 107791057 A | 3/2018 |

* cited by examiner

FIXTURE FOR MACHINING PARTS AND METHOD OF USING SAME

BACKGROUND OF THE INVENTION

The present invention relates to a fixture for manufacturing parts using various processes such as machining, milling, drilling, turning and boring and the method of using the fixture for the various manufacturing processes. More particularly, the fixture secures a blank part or other part to be processed, allows the blank part to be machined without negative quality issues ordinarily caused by external forces transmitted to the blank part by clamps such as chuck jaws, and permits unobstructed machining of portions of the blank part ordinarily blocked by clamps and/or chuck jaws upper.

Conventional manners of processing a blank part so it conforms to desired specifications require chuck jaws or clamps to hold the part while it is subjected to various processes such as milling, drilling and other machining. The clamps and jaws not only block significant areas of the part to machined but also, exert an enormous degree of pressure on the outer surface or diameter (herein after "OD") and/or inner surface or diameter (hereinafter "ID") of a blank part. Otherwise, the blank part would not be secure and may even be expelled from the machining apparatus. Unfortunately, the jaw pressure imparts undesirable forces through the part, and the forces cause parts to go out of round resulting in quality issues during milling. For example, the jaws transmit radial or/and axial forces to the blank part, and the stress of these forces results in roundness and flatness issues in the blank part and decreases milling and cutting quality as well as accuracy.

BRIEF SUMMARY OF THE INVENTION

This invention eliminates the negative quality issues of chucking, chuck jaws and other types clamping by securing a blank part to a sufficiently flat fixture on which the blank part moves through manufacturing processing. Using the fixture instead of chuck jaws or clamps allows the blank part to remain in a free state without the undesirable forces of chuck jaws and the associated quality issues. Additionally, machining can take place freely and unobstructed on the inner, outer and a portion of the lower surfaces of the blank part, which would otherwise be hampered or blocked by chuck jaws.

One aspect of the invention is a machining fixture configured to secure a blank part having part inner and outer circumferential surfaces, a part first axial face opposing a part second axial face, and at least two threaded part openings extending inwardly from the part second axial face and toward the first axial face. The machining fixture comprising a body sized to be disposable upon a pallet of a machine table and having an upper surface including a substantially flat annular surface section, an opposing lower surface and at least two through-holes extending between the upper and lower surfaces, and at least two fasteners each disposed at least partially within a separate one of the at least two through-holes such that the at least two fasteners project upwardly from the upper surface and the at least two fasteners are configured to threadedly engage a separate one of the at least two part openings so as to removably clamp the part second face against the body flat surface section.

In another aspect of the invention, the substantially flat annular surface section has a flatness between $0.0002 \pm 0.00005$ inches.

In another aspect of the invention, the body of the fixture has a centerline and the at least two through-holes are located substantially equidistant from the center line at a first diameter. Also, the at least two through-holes maybe a first set of through-holes and the fixture body may further comprise a second set of at least two through-holes located equidistant from the centerline at second diameter, the second diameter being greater than the first diameter. Additionally, the at least two through-holes may include four through-holes spaced circumferentially apart about the centerline at the first diameter.

In another aspect of the invention, each one of the at least two through-holes has a counterbore section extending from the body lower surface and toward the body upper surface, the counterbore section including an annular shoulder surface, and each one of the at least two fasteners includes a threaded rod, the rod being engageable with a separate one of the two part openings and having two opposing axial ends, and a head connected with one of the rod axial ends and disposeable against the counterbore shoulder section of one through-hole when the threaded rod is engaged with the part opening.

In another aspect of the invention, the fixture body has a centerline, and the fixture further comprises an inner circumferential surface extending about the centerline and axially between the upper and lower surfaces so as to define a central bore such that the fixture is configured for machining the part inner circumferential surface. Also, the central bore may include a counterbore section extending axially-inwardly from the body upper surface.

In another aspect of the invention, the body is sized to be disposeable upon a pallet of a machine and the body further comprises at least two mounting holes extending between the upper and lower surfaces of the body, and at least two mounting fasteners each disposed within a separate one of the mounting holes and engageable with the pallet to removably couple the body with the pallet.

Another aspect of the invention includes a method of machining an annular blank part including part inner and outer circumferential surfaces, a part first axial face opposing a part second axial face. The method comprises the steps of providing a fixture comprising an annular body having a fixture upper axial face having a substantially flat section and opposing a fixture lower axial face, and at least two through-holes extending from the fixture upper axial face inwardly through the fixture lower axial face, the at least two-through holes including a first hole and a second hole located a first distance apart; processing the part second axial face such that the part second axial face is substantially flat; forming at least two part openings in the part second axial face including a first part opening and second part opening extending from the part second axial face towards the first axial face, and the first and second part openings located the first distance apart; placing the part second axial face on the fixture upper axial face such that the first part opening is aligned with the first hole and the second part opening is aligned with the second hole, and the part second axial face is over the substantially flat section of the fixture upper axial face; providing at least two part fasteners including a first part fastener disposable in the first part hole and engageable with the first part opening and a second part fastener disposable in the second part hole and engageable with the second part opening; and machining at least one of the part inner circumferential surface, part outer circumferential surface, part first axial face or part second axial face.

In another aspect of the invention, the method further comprises inserting the first part fastener at least partially into the first hole and inserting the second part fastener at least partially into the second hole; and advancing the first and second part fasteners such that first part fastener threadedly engages the first part opening and the second part fastener threadedly engages the second part opening and the substantially flat section of the body upper axial face is clamped to the part lower axial face such that the fixture and blank part form a unit.

In another aspect of the invention, the step of providing the fixture further comprises providing at least two fixture holes in the fixture body, and the at least two fixture holes are through-holes extending from the upper axial face through the lower axial face and the first fixture hole and second fixture hole are located a second distance apart.

In another aspect of the invention the method of machining a blank part may further comprise the steps of providing a pallet with at least two threaded fixture openings including a first fixture opening a second fixture opening located a second distance apart; placing the unit on the pallet such that the fixture lower axial face contacts the pallet and the first fixture hole is aligned with the first fixture opening and the second fixture hole is aligned with the second fixture opening; providing at least two fixture fasteners including a first fixture fastener and a second fixture fastener; inserting the first fixture fastener into the first fixture hole and inserting the second fixture fastener into the second fixture hole; and advancing the first and second fixture fasteners such that the first fixture fastener threadedly engages the first fixture opening and the second fixture fastener threadedly engages the second fixture opening and the fixture lower axial face of the body is clamped to the pallet.

In another aspect of the invention, each one of the at least two through-holes has a counterbore section extending from the lower axial face and toward the upper axial face, the counterbore section including an annular shoulder surface, and the step of providing at least two part fasteners including first and second part fasteners further comprises providing first and second threaded rods, the rods being engageable with a separate one of the two part openings and having two opposing axial ends, and a head connected with one of the rod axial ends and disposeable against the counterbore shoulder section of one through-hole when the threaded rod is engaged with the part opening.

In another aspect of the invention, the step of providing the fixture further comprises providing the fixture with the annular body having a centerline, and the at least two through-holes are a first set of through-holes located a first diameter from the centerline, and providing a second set of at least two through-holes in the fixture body, the second set of at least two through-holes located equidistant from the centerline at second diameter, the second diameter being greater than the first diameter.

In another embodiment, the step of providing the fixture may further comprises providing the fixture with the annular body having a centerline and providing the at least two through-holes includes providing four through-holes spaced circumferentially apart about the centerline at a first diameter.

In another embodiment, the step of providing the fixture may further comprises providing the fixture with the annular body having a centerline and providing an inner circumferential surface in the fixture body extending about the centerline and axially between the upper and lower surfaces so as to define a central bore such that the fixture is configured for machining the part inner circumferential surface. Additionally, the step of proving the inner circumferential surface may include providing the inner circumferential surface so as to define the counterbore section extending axially-inwardly from the body upper surface.

In another aspect of the invention, the step of providing the fixture may further comprise providing the fixture with the fixture lower axial surface being substantially flat, and the fixture upper axial surface and fixture lower axial surface are substantially parallel to each other.

Another aspect of the invention is a manufacturing assembly comprising a fixture sized to be disposable upon a machine table including an annular body having inner and outer circumferential surfaces, a body upper axial face opposing a body second axial face, a substantially flat section on the body upper axial face, and at least two through-holes extending inwardly from the body upper axial face and toward the body lower axial face; an annular blank part sized to be disposable upon the fixture, the annular blank including part inner and outer circumferential surfaces, a part first axial face opposing a substantially flat part second axial face, and at least two part threaded openings extending inwardly from the part second axial face and toward the first axial face; and at least two fasteners each disposed at least partially within a separate one of the at least two through-holes such that the at least two fasteners project upwardly from the body upper axial face and threadedly engage a separate one of the at least two part openings such that the part second face is removably clamped against the flat section of the body upper axial face.

In another embodiment, the substantially flat surface section on the body upper axial surface and the part first axial face have a flatness about 0.0002±0.00005 inches. In another aspect of the invention, the assembly further comprises at least two mounting holes extending between the upper and lower surfaces of the body; and at least two mounting fasteners each disposed within a separate one of the mounting holes and removably engageable with the machining table.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the words "connected" or "coupled" are each intended to include integrally formed members, direct connections between two distinct members without any other members interposed therebetween and indirect connections between members in which one or more other members are interposed therebetween. The terms "flat" and "flatness" refer to a relative degree of flatness of a manufactured or milled part and may be used interchangeably herein. The terminology includes the words specifically mentioned above, derivatives thereof, and words of similar import.

Figure 1:
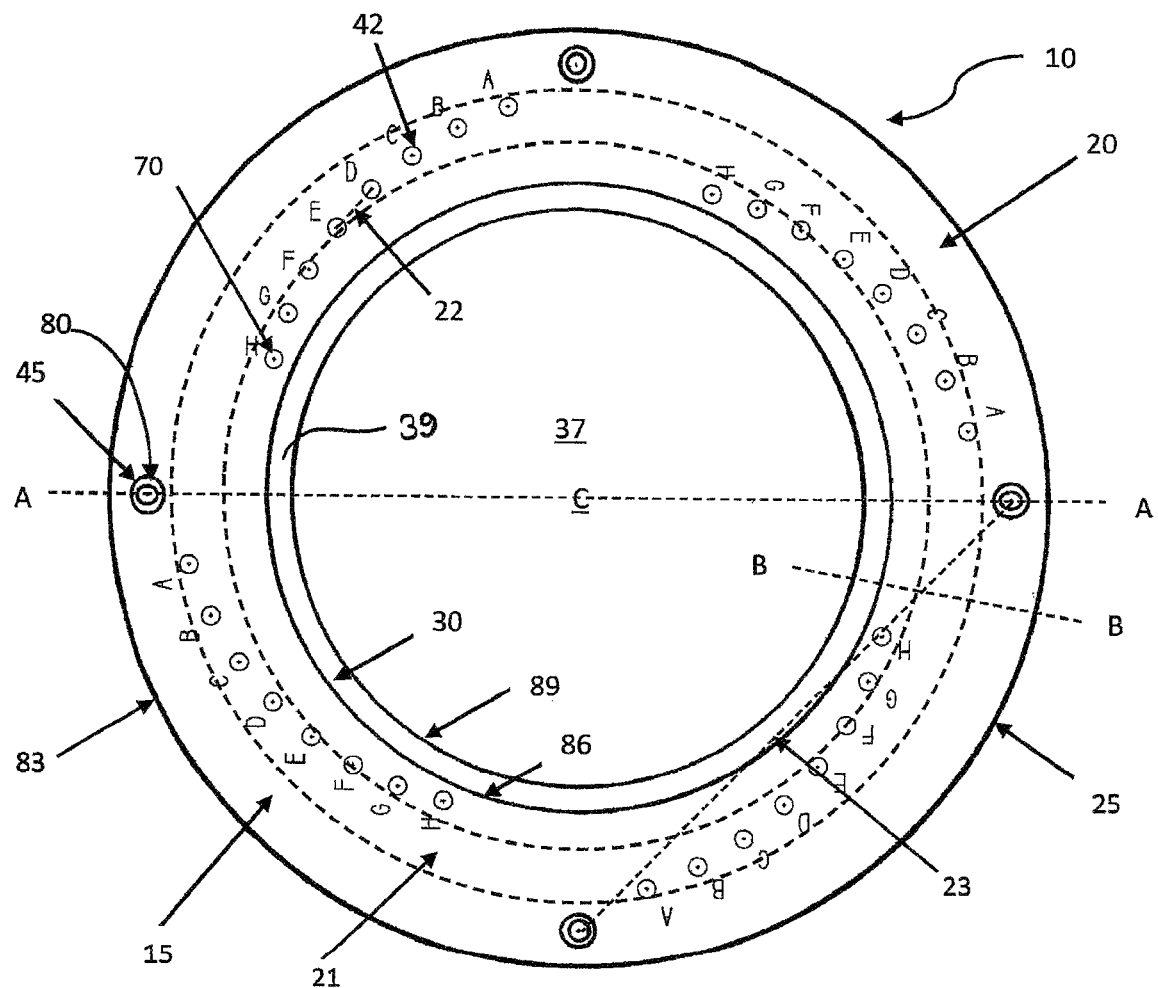
FIG. 1 is a top plan view of a preferred embodiment of the fixture showing an annular ring with holes for securing a blank part to the fixture and holes for securing the fixture to a milling machine.
Figure 2:
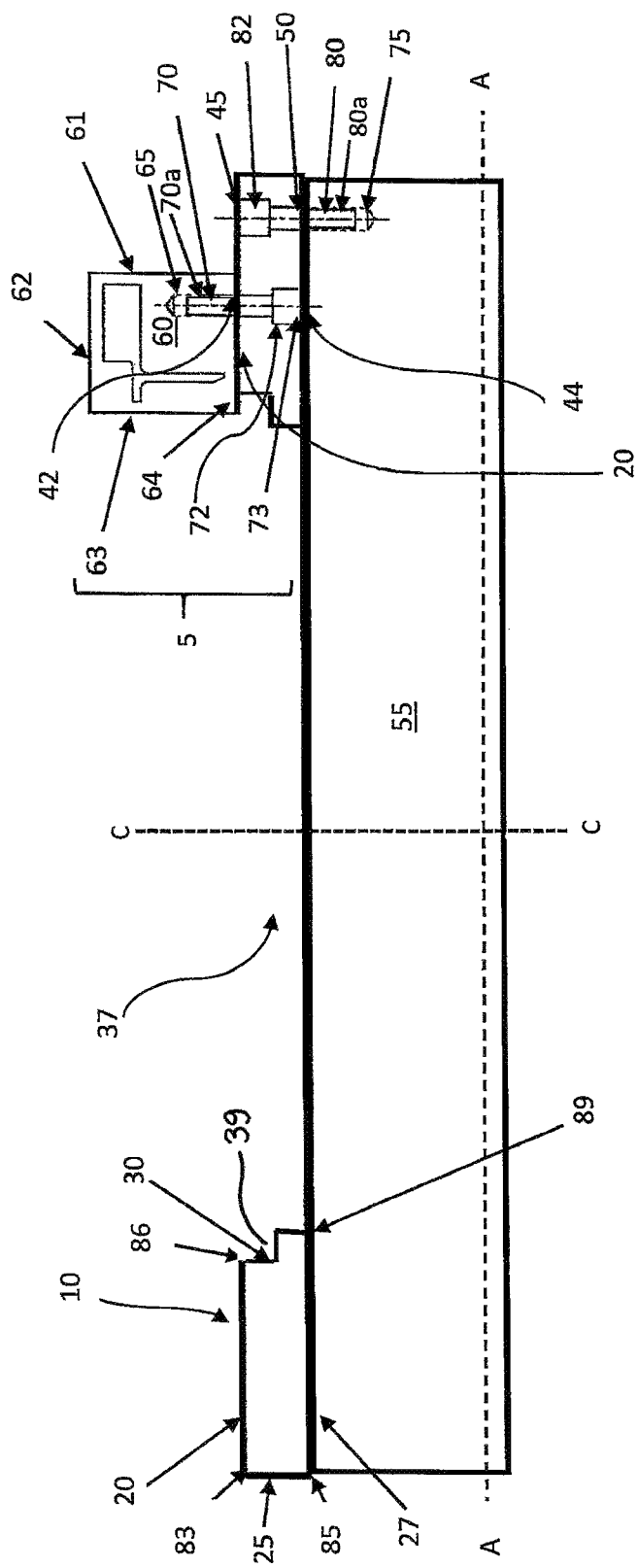
FIG. 2 is a cross-sectional, side view of the fixture along line A-A of FIG. 1.

Referring now to the drawings in detail, wherein like numbers are used to indicate like elements throughout, there is shown in FIGS. 1-2, a preferred embodiment of a fixture 10 on which a blank part 60 may be secured during manufacturing or machining by apparatuses such as a numerical control (NC), computer numeric control machine (CNC), milling machine, robotic cutting machine, and/or other apparatuses that perform cutting, etching, milling, drilling routing and/or fabrication, etc. The fixture 10, in this embodiment, basically comprises an annular ring 15 surrounding a center line or axis C and central opening 37, a plurality of part holes 42 for use with a corresponding plurality of part fasteners 70 and a plurality of fixture holes 45 for use with a plurality of corresponding fixture fasteners 80. Additionally, the fixture 10 has an upper face 20 with a section 21 having a degree of flatness sufficient for connecting to the blank part 60. As shown in FIG. 2, the blank part 60 abuts or directly contacts and is secured with blank part fastener 70 to section 21 of the upper surface 20 of the fixture 10.

The preferred embodiment is shown in FIGS. 1, 2 & 3A-C as a fixture 10 connected to an annular ring shaped blank part for machining into a ring seal or bearing for use in various industrial machines such as a compressor, air craft or other engine, windmill, mining equipment, automotive parts, etc. When properly positioned and connected to fixture 10, blank part 60 may be machined entirely on a part inner circumferential face 63, a part outer circumferential face 61, a part upper axial face 62 and/or a portion of a part lower axial face 64

As shown in FIGS. 1-2, the annular ring-shaped fixture 10 has an upper face 20 opposite a lower face 27, and a perimeter face 25 opposite an interior face 30. The upper and lower faces 20, 27 are annular and extend radially or outwardly from centerline C. Also, the upper face 20 and lower face 27 are substantially parallel to each other. In the preferred embodiment, for example, upper face 20 and lower face 27 are parallel to each other within a range of 0.0005±0.0001 inches. Based on the size and type of a part to be machined, it is foreseeable upper face 20 and lower face 27 may be more or less parallel to each other.

Upper face 20 or at least a portion thereof has a degree of flatness sufficient to ensure blank part 60 may be connected to the fixture 10 without being forced to conform to relatively uneven section of upper face 20. If the section of the upper face 20 on which part lower axial face 64 sits is uneven or lacks the necessary degree of flatness, the surface 20 will contain some points of contact between the blank part 60 and lower face 20 that are relatively higher than others. Then, when the blank part is secured to fixture 10, it may be forced to change shape or bend around the uneven upper face 20. After machining and the blank part is removed from fixture 10, the blank part returns to its original shape, but the blank part has been inaccurately machined due to the lack of flatness of upper surface 20. Additionally, uneven contact between the relatively higher portions of upper face 20 and part lower face 64 will result in uneven forces being transmitted to the blank part 60.

As a result, the degree of flatness of the upper face 20 or section 21 thereof contacting blank part 60 should be sufficient enough to allow a blank part or blank part 60 to be secured to fixture 10 so it is in a natural or rest position i.e. without being forced to accommodate relatively higher and lower portions of the surface. In the preferred embodiment, which relates to seals and bearings for aircraft engines and other similarly sized applications like those in the automotive industry, upper surface 20 has a degree of flatness of 0.0002±0.0005 inches. Features of blank part 60, such as size, shape and composition as well as the type of processing to be performed, may be considered by one of ordinary skill in the art to determine the required degree of flatness. It is foreseeable that machining relatively larger bearings may require less flatness on upper face 20.

Lower face 27 of fixture 10 also has a degree of flatness sufficient to allow the fixture to be connected to pallet 55 or other machining apparatus and blank part 60 and maintain its natural or rest position. In the preferred embodiment, the degree of flatness of lower face 27 is 0.0002±0.0005 inches. It is also foreseeable that the required degree of flatness of the lower face 27 may change based on factors such as the size, shape and type of machining to be performed.

In the preferred embodiment, section 21 is shown as an annular area of similar shape to fixture 10. In other embodiments, it is envisioned that section 21 may have other shapes and forms that may be necessary based on the size and shape of various parts to be machined.

The plurality of part fasteners 70 is another aspect of the invention that eliminates forces being transmitted to the blank part 60 during processing. As shown in FIG. 2, part fasteners 70 are connected to fixture 10 and extend from the upper face 20 of fixture 10 such that a portion 65 of each part fastener 70 may engage or fit into the part lower face 64 which is a flat surface of part 60. The plurality of part fasteners 70 engaging only the lower surface 64 of blank part 60 and ensuring the blank part rests on or is connected to an upper surface 20 with a sufficient degree of flatness allows two flat surfaces to mate. As a result, there is even distribution of pressure which is comparable to blank part 60 being in its free state. This also allows the part 60 to be machined on the inner circumferential face or ID 63, outer circumferential face or OD 61, and upper axial face 62 without chuck jaw interference or obstructions and the negative forces imparted into the blank part 60 by the chuck jaws or clamps being applied to the ID 63 and/or OD 61.

The use of the fixture 10, instead of conventional chucking or other clamping systems, to process and manufacture parts has many benefits. Parts may be produced rounder and flatter than with conventional chucking. For example, relatively tighter processing tolerances (i.e. 0.0001 inch) regarding runout and circularity may be achieved using the fixture when compared to conventional chucking (i.e. 0.001 in.) runout and circularity. Further, machining may be performed much more quickly relative to standard chucking because multiple features such datum pockets, scallops, and holes that are concentric to the datum can be machined in one process step, rather than using multiple steps due repositioning the blank part to avoid the chuck jaws. Also, relatively more processing operations may be incorporated and used on the blank part regardless of the shape of the part.

The perimeter or circumferential face 25 connects to the radially outermost portions of the upper and lower faces 20, 27 and forms upper and lower perimeter edges 83, 85, respectively. The interior surface 30, as shown in FIGS. 1 and 2, surrounds a central bore or opening 37, and interior surface connects the radially innermost portions of upper and lower faces 20, 27 forming interior edges 86, 89, respectively. In the preferred embodiment interior surface 30 has a stepped cross section so the lower interior edge 89 has a relatively shorter distance and/or radius to the centerline C than the distance and/or radius to the centerline C from the upper interior edge. This relationship translates into the lower interior edge 89 having a total length or circumferential length relatively less than the total length or circumferential length of the upper interior edge 86.

As shown in FIG. 1, fixture 10 has four sets or pluralities of part holes 42. Each set is located in a different quadrant of the fixture 10, and each set includes holes A-H extending from the upper face 20 through the lower face 27. The part holes 42 in each set are arranged so the distance from each hole 42 to the centerline C varies or is not equivalent. This allows fixture 10 to accommodate blank parts having various sizes and shapes. As shown, the distance between centerline C to each hole 42 increases with each additional letter of the alphabet. For example, the distance from centerline C to hole B is relatively greater than the distance from the centerline C to hole A, and the distance from centerline C to hole C is relatively greater than the distance from centerline C to hole B and so on. The position of holes 42, as shown in FIG. 1, is an example of one possible arrangement of part holes 42. Other numbers of openings 42 and positions, more or less, are envisioned and can be designed based on various considerations such as the type and size of blank part 60 and machining to be performed. For example, it is conceivable that fixture 10 may be used with as few as a single part opening 42 or double part openings 42. In another embodiment of the invention, there may be at least two sets of part holes 42 and each set has at least a first part hole 42 a distance, x, from centerline C and a second part hole 42 a distance, y, from the centerline C.

Fixture holes 45, as shown in FIG. 1, are about 90 degrees apart, equidistant from centerline C and relatively further from centerline C than part openings 42. Fixture openings 45 may be used to secure the fixture 10 to a fixed point, such as a pallet 55 or other mobile manufacturing apparatus on which the fixture 10 may be moved through various machining, processes such as drilling, milling, etc. Alternatively, the fixture 10 may be directly connected to a stationary or single manufacturing apparatus for processing without being secured to a pallet or other mobile carrier. While FIG. 1 depicts four fixture openings 45 at specific locations, it is envisioned that more or less fixture openings 45 may be used at different locations and may be placed in the fixture 10, as needed by different types of parts machining or milling and the different apparatuses that the fixture may be connected.

FIG. 2 shows a cross-sectional side view of FIG. 1 along line A-A including a blank part 60 secured to fixture 10, which is fixed to pallet 55 for manufacturing a part such as a ring seal or bearing ring. The cross-sectional side view provides a detailed view of part hole 42 and fixture hole 45 as well as respective part and fixture fasteners 70, 80. As shown, part hole 42 and fixture hole 45 are counterbores or stepped through holes formed to permit part fastener 70 and fixture fastener 80, respectively, to pass completely through fixture 10. Part hole 42 and fixture openings 45 are colinear or contiguous with blind hole or opening 65 in blank part 60 and blind hole or opening 75 in pallet 55, respectively. The counterbore sections 72 and 82 of respective openings 42 and 45 permit the respective fasteners 70, 80, once fully inserted, to remain flush or even with surfaces 20, 27 from which the fasteners are inserted. Additionally, upon full insertion, blank part fasteners 70 are configured to extend beyond the upper surface 20 such that a portion 70a engages, fits into and or connects fixture 10 to the blank part via blind hole or opening 65. Also, upon full insertion, fixture fastener 80 has a portion 80a extending beyond the lower surface 27 into blind hole or opening 75 in pallet 55. Portion 80a permits fixture 10 to be connected to pallet 55.

Figure 3A:
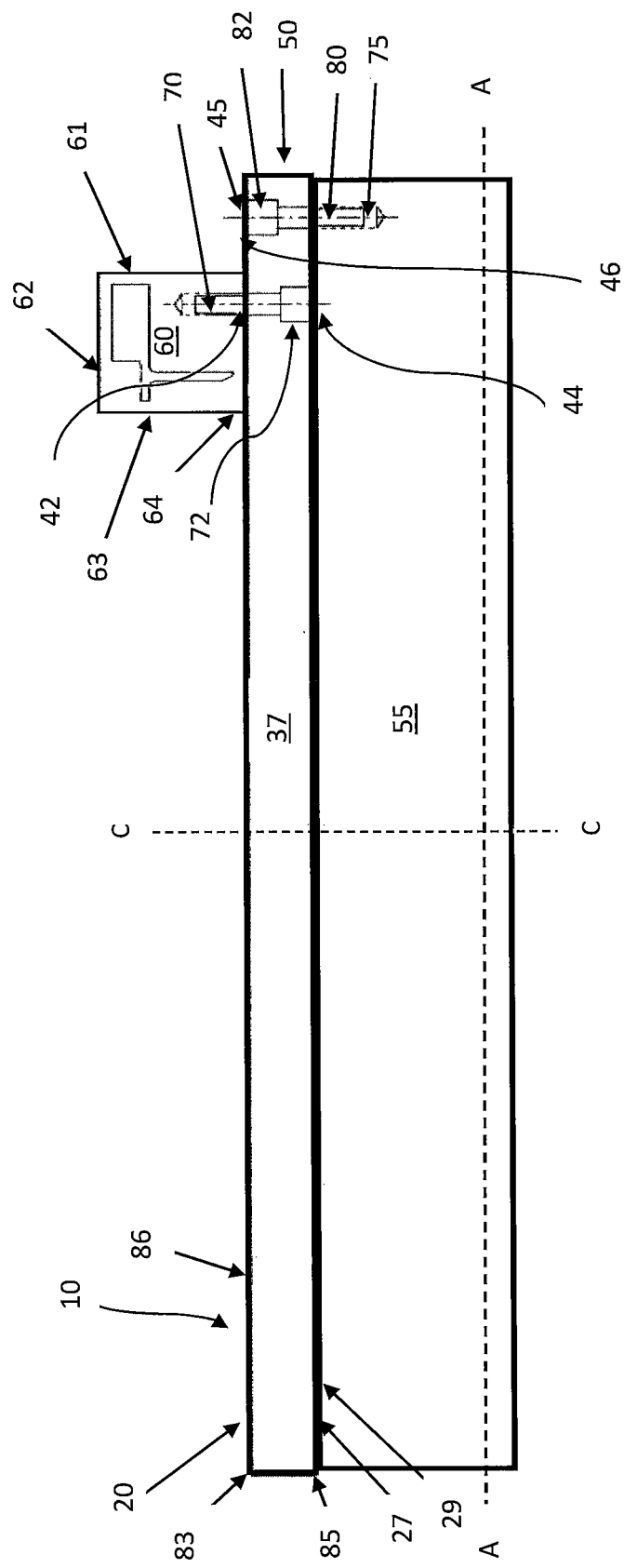
FIGS. 3A-C are cross-sectional side views of alternate embodiments of the fixture along line A-A of FIG. 1.
Figure 3B:
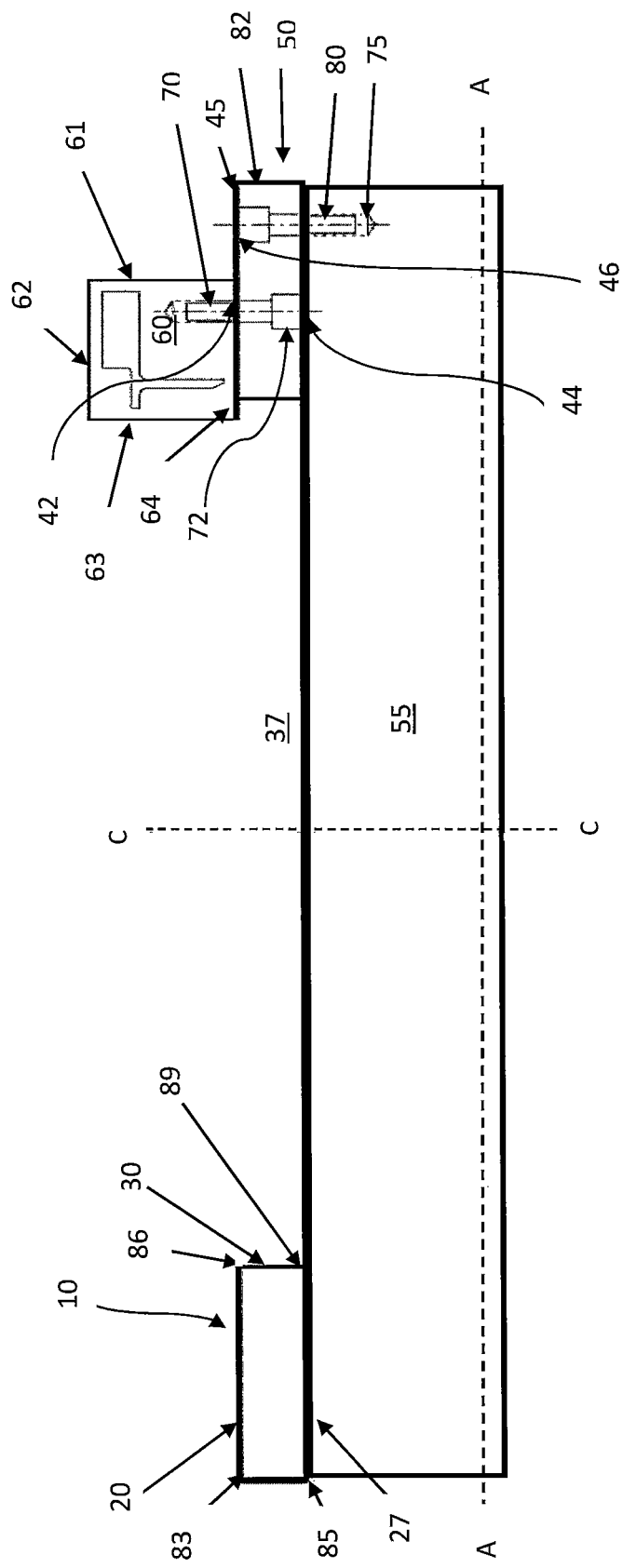
Figure 3C:
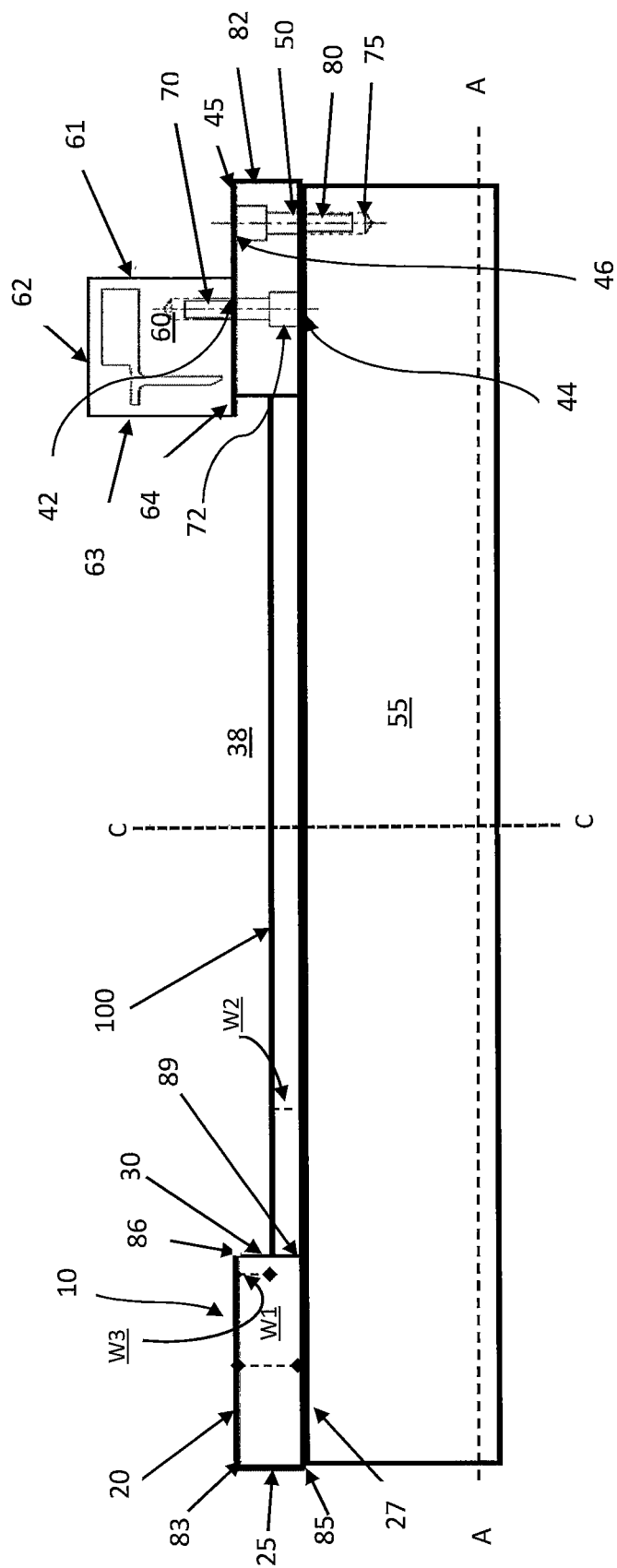

As shown in FIG. 3c, the distance between the fixture upper face 20 and lower face 27 is equal to height, W1. Although other arrangements are envisioned, fasteners 70 and 80 are longer than W1. The added length permits fasteners 70, 80 to extend beyond the upper face 20 and lower face 27.

Although other fastener systems or configurations may be possible, part and fixture fasteners 70 and 80 are threaded, and part and fixture holes 42, 45 are counterbores or stepped through holes that are reciprocally threaded to receive fasteners 70 and 80. Additionally, other structures (e.g. countersink or through holes) for holes 42, 45 and types of fasteners 70 and 80 may be used. Some examples of applicable threaded fasteners may include various bolts or screws that correspond to the shape and threads of the selected types of holes 42, 45. It is also noted that holes 42, 45 and fasteners 70, 80 are discussed plurally, but there may be one to any number of openings 42, 45 and corresponding fasteners 70, 80.

FIG. 2, also, depicts part holes 42 and fixture holes 45 having opposing positions. For example, the counterbore 72 of part hole 42 has a counterbore hole 44 in lower surface 27 and extends upwardly and/or axially through fixture 10 with a relatively smaller part hole 42 on upper surface 20. On the other hand, counterbore 82 of fixture hole 45 has a counterbore hole that opens on upper surface 20 and extends downwardly and/or axially through fixture 10 with a relatively smaller hole 50 on the lower face 27.

As shown in FIG. 2, part fastener 70 is positioned in part hole 42 so the end face 73 of part fastener 70 is even or flush with lower face 27 of fixture 10. If end face 73 is not even with or flush with lower face 27, then part fastener 70 and/or part holes 42 will interfere with the necessary degree of flatness of lower surface 27. As discussed above, this may introduce undesirable forces into the blank part 60 and cause quality issues and distortions during processing and milling.

To prevent obstruction of surfaces near fixture openings 45, fixture fasteners 80 are also shown in counterbore holes 45. This allows the processing tools unrestricted access to the OD or perimeter surface 61 of blank part 60. Depending on the size, shape and position of blank part 60 on the fixture 10, fasteners 80 may not need to be flush with surface.

The ID or interior surface 30 is free from the need of clamps, chuck jaws and/or fasteners. Central opening or bore 37 allows a processing machine or tool free access to the blank part 60 and especially, blank part interior circumferential face or ID 63 and even a portion of part lower axial surface 64. A properly sized opening 37 will permit required and/or unrestricted movement of a cutting tools, milling tools, robotic arms, etc. As shown in FIGS. 1 and 2, the central opening or bore 37 is circular and has an outer perimeter or circumference formed or defined by interior face 30. As discussed above, the interior face 30 has a stepped cross-section.

Depending upon the location, types of machining to be performed on blank part 60 and shape of blank part 60, other embodiments of the central portion of fixture 10 are possible. For example, as shown in FIG. 3B, the interior surface 30 and the perimeter surface 25 may be generally parallel, co-axial and extend axially. It is also contemplated that some processing may not require a central opening 37. In FIG. 3A, no opening is formed in fixture 10. Rather, upper and lower faces 20, 27 are generally parallel and extend radially inwardly from perimeter surface 25. FIG. 3C depicts another embodiment with a depression or recess 38 formed partially through the fixture 10. In other words, the recess 38 does not extend through the entire width W1 of fixture 10 and has a recess face 100. The recess 38 has a depth or width W3, which is the distance from upper face 20 to recess face 100. The portion of the fixture 10 that forms the bottom of recess 38 has a height or width W2, which is the distance from the lower face 27 to recess face 100. In this example, interior face 30 does not extend completely through fixture 10. Rather, it has a height or length generally equivalent to width W3, and width W2 plus width W3 is generally equal to width W1.

Figure 4A:
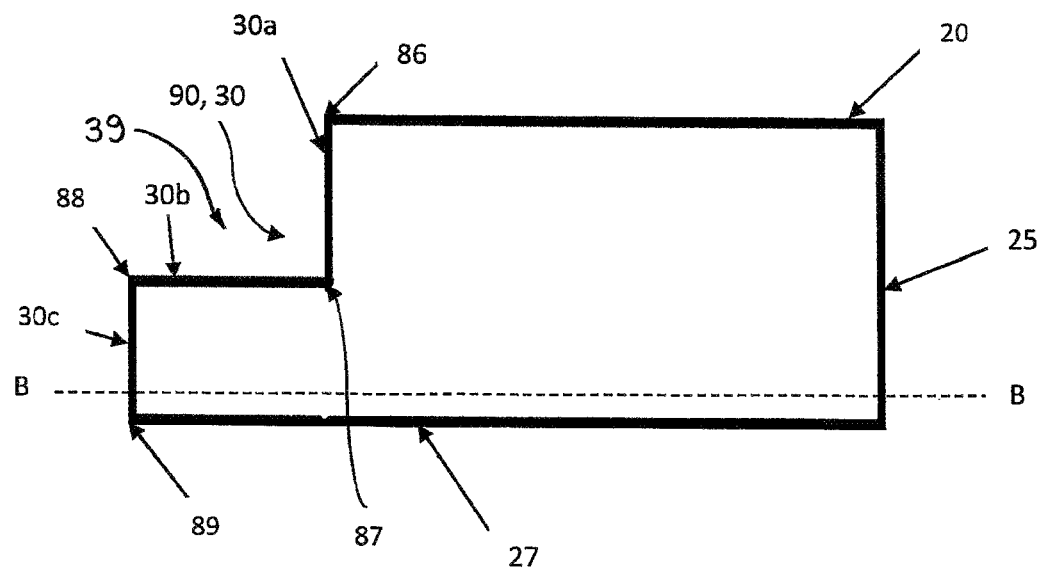
FIG. 4A depicts a cross-sectional side view of the embodiment in FIG. 1 along line B-B.

FIGS. 1 and 2 show a preferred embodiment in which interior face 30 has a stepped cross-section 90, and FIG. 4A shows an exploded view of the stepped cross-section 90 of the fixture 10 along line B-B in FIG. 1. The stepped cross-section 90 comprises interior face sections 30a, 30b, and 30c. Interior face section 30a is connected to the upper face 20 forming edge 86. Interior face section 30a extends generally axially from edge 86 towards interior face section 30b, and interior face sections 30a and 30b connect to form edge 87 and define a counterbore section 39 of the central bore 37. Interior face section 30b extends radially between edges 87 and 88 forming step 90. Edge 88 is formed where interior face section 30b connects to interior face section 30c which extends axially towards lower face 27. Edge 89 is formed at the connection point of interior face section 30c with lower face 27. Due to the stepped cross-section, edge 86 and interior rice 30a are relatively further from central axis C than edges 88 and 89 and interior face section 30c.

As shown in FIG. 4A, interior face sections 30a and 30c may be generally co-axial and formed generally at a right angle to upper face 20 and lower face 27. Interior face section 30b may be formed generally at a right angle to surfaces 30a and 30c. However, other structures of interior face 30 are possible. For example, faces 30a, 30b and 30c may each extend axially and radially.

Figure 4B:
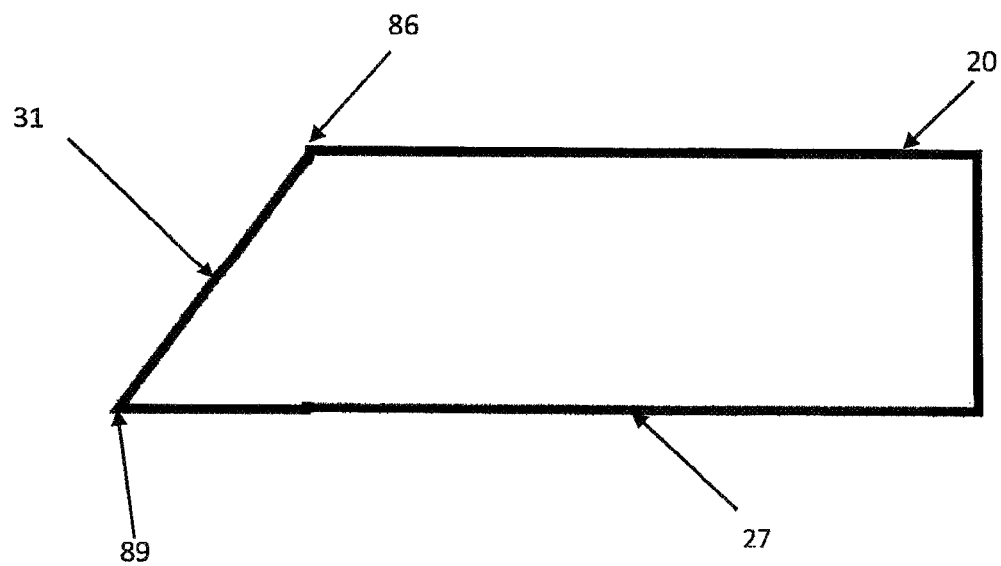
FIG. 4B depicts an alternate embodiment of the cross-sectional sideview of the embodiment in FIG. 1 along line B-B.

The stepped cross-section of interior surface 30, as discussed above, is a preferred embodiment. FIG. 4B depicts another example for the boundary of central bore or opening 37 along line B-B of FIG. 1. In this example, interior face 30 has a beveled interior face 31 between upper surface 25 and lower surface 27.

Figure 5A:
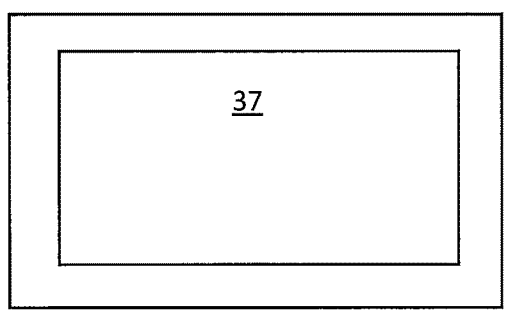
FIGS. 5A-5F are top plan views of alternate embodiments of the shapes of the fixture of FIG. 1.
Figure 5B:
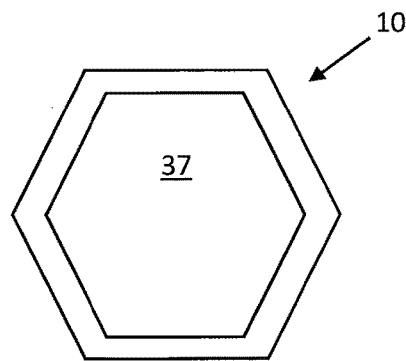
Figure 5C:
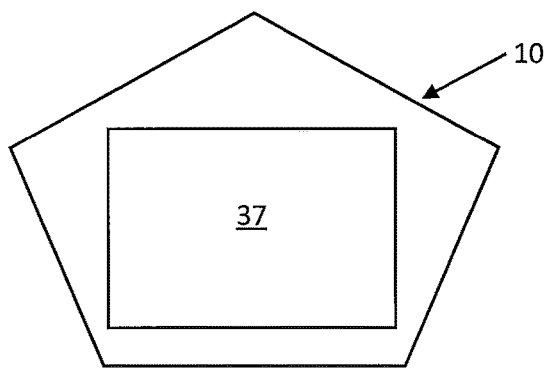
Figure 5D:
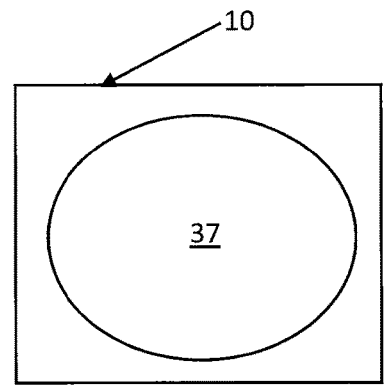
Figure 5E:
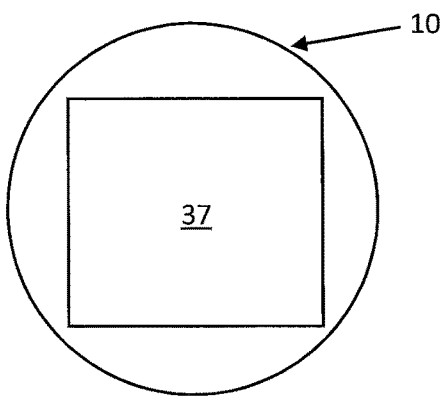
Figure 5F:
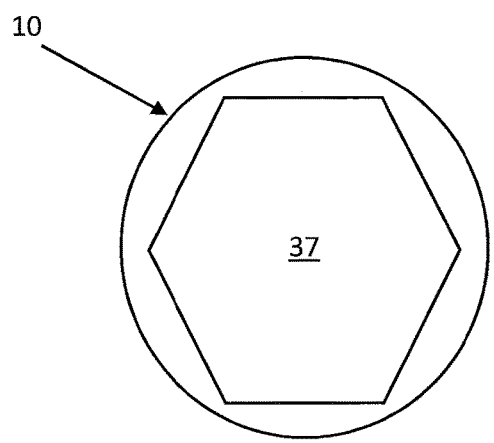

The preferred embodiment of fixture 10 is the form of an annular ring as shown in FIGS. 1-2, however, fixture 10 may be formed in various polygonal shapes with similar shaped central openings 37 or different shaped openings. FIGS. 5A and 5B are exemplary top plan views of fixture 10 as a rectangle with a rectangular opening 37 and a hexagon with a hexagonal opening 37, respectively. FIGS. 5C-5E illustrate top plan views of fixture 10 in polygonal shapes with different shaped openings. For example, FIG. 5C shows a pentagonal fixture 10 with a rectangular opening 37. FIG. 5D shows a rectangular or square fixture 10 with an annular or circular opening 37. FIGS. 5D and 5E are circular or annular fixtures 10 with square and hexagonal openings 37, respectively. The embodiments provided in FIGS. 5A-5E are examples of some possible embodiments, but many other shapes with similar or different shaped openings or no openings are contemplated. One of ordinary skill in the art, may select the appropriate size and shaped fixture 10 based on the specific machining and processing required for a specific blank part 60.

The fixture 10 may be constructed of various types of metal alloys such as those formed by steel or aluminum and other alloys or materials with sufficient strength to secure the fixture during machining. In the preferred embodiment, fixture 10 is formed of cold rolled steel.

Figure 6:
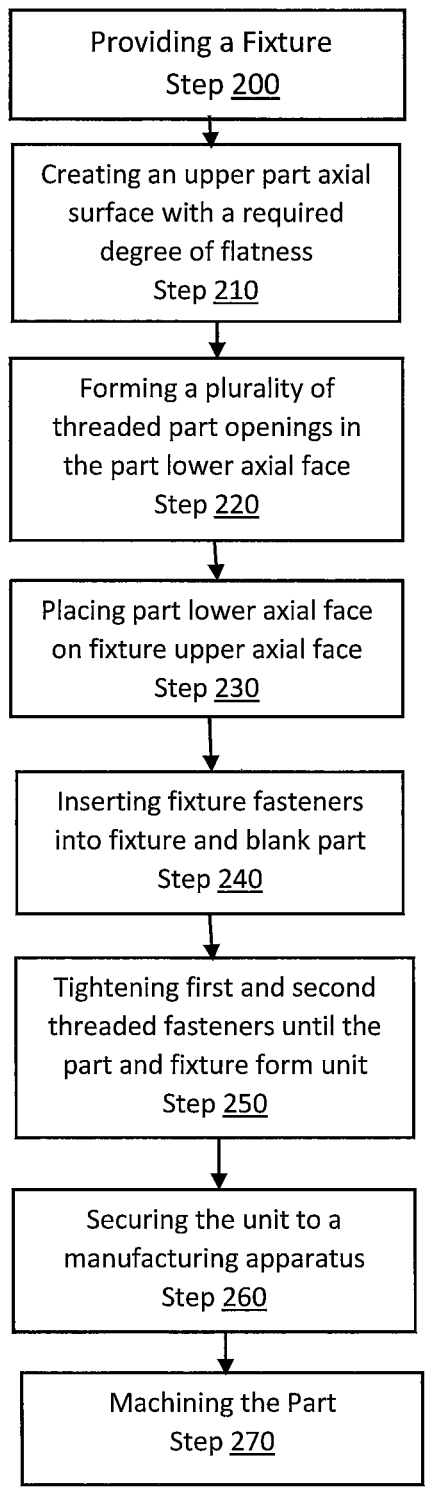
FIG. 6 is a process diagram for the method of using the fixture in FIGS. 1-3A-C.

FIG. 6 depicts one embodiment of the method of using the fixture 10 to machine at least one of a part inner circumferential surface 63, a part outer circumferential surface 61, a part upper axial face 62 or a part lower axial face 64 of a blank annular ring part 60. This embodiment is directed towards fabrication or machining of annular ring-shaped parts for bearings and seals for engines (e.g. boat, auto and air craft), industrial equipment such as compressors, but it may be used to fabricate any type of part requiring machining.

The method comprises the following steps. Step 200 includes providing a fixture 10 comprising an annular ring 15 including a fixture upper axial face 20, a plurality of threaded part holes 42 including a first part hole 42 and a second part 42 hole extending from the fixture upper axial face 20 through a fixture lower axial face 27, and the first part hole 42 and second part hole 42 being a first distance apart. This is shown in FIG. 1 by the distance between holes D and F and denoted by number 22. It is noted that the first distance could be the distance between any two holes 42 positioned on the fixture and could even be the distance between a hole D and another hole D extending across the central opening 27.

As discussed above, the upper axial face 20 or a section 21 thereof and the lower axial face are substantially flat and/or have the specified degree of flatness necessary for a blank part 60 to be secured to the fixture without distorting the blank part. The required degree of flatness may be achieved by machining (i.e. lapping or grinding) upper axial and lower axial faces 20 and 27.

Additionally, fixture upper axial face 20 and lower axial face 27 are substantially parallel. As discussed above with respect to the preferred embodiment, the upper axial and lower axial faces 20, 27 may be parallel to each other at 0.0005±0.0001 inches.

Step 210 comprises processing the part lower axial face 64 such that the part lower axial face 64 is also substantially flat and/or has a degree of flatness that allows a flat surface of the fixture upper axial face 20 to abut and be secured to the part lower axial face 64 so that part 60 remains in its natural state. This required degree of flatness of part lower axial face 64 may be also be achieved by machining (i.e. lapping or grinding). In the preferred embodiment of the invention, the degree of flatness is 0.0002±0.00005 inches. It is foreseeable that the required degree of flatness may change based on various factors such as size and type of machining.

In Step 220, a plurality of threaded part openings is formed in the part lower axial face 64. As shown in FIG. 2, the threaded part openings formed as blind holes 65 in the preferred embodiment. The holes 65 may be formed using methods known in the art such as drilling. Additionally, this step includes forming the plurality of threaded part openings 65 with a first part opening 65 and second part opening 65 positioned in the part lower axial face 60 so they are separated by the first distance 21.

The part lower axial face 64 is placed on fixture upper axial face 20 or section 21, in step 230. This is performed such that the first part opening 65 is contiguous or colinear with the first part hole 42 and the second part opening 65 is also contiguous or colinear with the second part hole 42. Additionally, in this step, the part lower axial face 64, which is substantially flat and/or has a specific degree of flatness, is placed the fixture upper axial face 20, which is also substantially flat or has a specific degree of flatness.

Step 240 comprises inserting a first threaded fastener 70 of a plurality of threaded fasteners through the first part hole 42 into the first part opening 65 and inserting a second fastener 70 of a plurality of threaded fasteners through the second part hole 42 and the second part opening 65. As shown by the preferred embodiment in FIG. 2, fastener 70 is inserted into the fixture lower axial surface 27 and inserted through fixture 10 and into part opening 65. As discussed above, the threaded fasteners 70 may be bolts, screws or other types of threaded fasteners.

Next, step 250 includes tightening the first threaded faster and the second threaded faster until the part and fixture are connected and form a unit or assembly 5 with the part lower axial face abutting the section of the fixture upper axial face. For example, if bolts are used as the threaded fasteners, the bolts are rotated until the part 60 is securely connected to the fixture forming unit 5. When the two pieces are securely connected the flat section 21 of the upper axial face of fixture 10 and the part lower axial face 27 are securely or fixedly connected. In other words, neither the part 60 nor the fixture may move relative to each other.

Step 260 allows fixture 10 to be connected to or secured to different manufacturing apparatuses. The apparatuses may be a pallet 55, which may be mobile, as shown in FIGS. 2 & 3A-3C, or directly to a stationary machining apparatus such as part of a milling or drilling machine. In the preferred embodiment, the fixture is connected to pallet 55. To make this connection, fixture 10 is provided with a plurality of threaded fixture holes 45 including a first fixture hole 45 and a second fixture hole 45 extending from the fixture upper axial face 20 through the fixture lower axial face 27, ensuring the first fixture hole 45 and second fixture hole 45 are a second distance 23 apart. The second distance 23 is shown on FIG. 2 as the distance between two fixture holes 45.

A manufacturing apparatus such as pallet 55 is also provided with a plurality of threaded fixture openings 75, as shown in FIG. 2. The plurality of threaded fixture openings 75 are preferably formed as blind holes and includes a first fixture opening 75 and second fixture opening 75. Similar to the first fixture hole 45 and second fixture hole 45, the first and second fixture openings 75 are a second distance 23 apart.

Additionally, the upper surface 29 of pallet 55 is also substantially flat or has a specific degree of flatness required to secure the fixture to pallet 55 without causing any distortions in fixture 10. In the preferred embodiment, upper surface 29 has a degree of flatness of 0.0002±0.00005.

The unit or assembly 5 is connected to the pallet 55 by placing the fixture lower axial surface 27 on the upper surface 29 of pallet 55 with the first fixture hole 45 contiguous or colinear with the first fixture opening 75 and the second fixture hole 45 contiguous or colinear with the second fixture opening 45. Next, first and second threaded fixture fasteners 80 of a plurality of threaded fixture fasteners are inserted through corresponding first and second fixture holes 45 on the fixture upper axial face 27, through fixture 10 and into corresponding first and second fixture openings 75.

Threaded fixture fasteners 70 may be bolts, screws or other types of fasteners. In this embodiment, fasteners 70 are bolts. The bolts are tightened or rotated until fixture 10 is securely connected pallet 55. In other words, the bolts are tightened by rotation until fixture 10 and pallet 55 are so tightly connected that neither the pallet 55 not the fixture 10 may move relative to each other.

Once part 60 and fixture 10 are securely connected and form unit 5, step 270, which includes machining the part 60, may be performed. Various types of machining may be performed such a CNC milling machine, drilling, boring, etching, milling and any other appropriate cutting equipment. Due to the absence of chuck jaws and other conventional clamping systems that abut and block areas of the ID and OD of parts, machining may be performed, in this step, on at least three surfaces including the part outer circumferential face 63, part inner circumferential face 61, and part upper axial face 62. Depending upon the size and position of the blank part 60 on the fixture 10, as shown in FIG. 2, there may also be a portion of the part lower axial face 64 that may be machined. Another benefit of the unobstructed access to faces 61, 62 and 63 is the part does not need to be repositioned or rotated before machining areas of faces 61, 62 and 63 that would otherwise be blocked by the chuck jaws or clamps on the ID and OD of the part 60.

In another aspect of the invention, providing the fixture in step 200 also includes providing a fixture 10 having a centerline C. In the preferred embodiment, an annular ring shaped fixture is provided with a central opening 37 and the annular ring surrounds centerline C. Additionally, as shown in FIG. 1, each threaded part hole 45 of the plurality of threaded part holes is a different distance from the central axis.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A machining assembly comprising:
   a blank part having part inner and outer circumferential surfaces, a part first axial face, an opposing, substantially flat part second axial face, and at least two threaded part openings extending inwardly from the part second axial face and toward the first axial face;
   a fixture including an annular body sized to be disposable upon a pallet of a machine table and having inner and outer circumferential surfaces, an upper axial surface including a substantially flat annular surface section, the blank part being disposed upon the flat annular surface section, an opposing lower axial surface and at least two through-holes extending between the upper and lower surfaces; and
   at least two fasteners each disposed at least partially within a separate one of the at least two through-holes of the annular body such that the at least two fasteners project upwardly from the upper surface and the at least two fasteners threadedly engage a separate one of the at least two threaded part openings of the blank part so as to removably clamp the part second axial face against the substantially flat annular surface section of the annular body;

wherein the annular body further has a centerline and an inner circumferential surface extending about the centerline and axially between the upper and lower surfaces so as to define a central bore sized to receive at least a portion of a machining tool such that the fixture is configured for machining the blank part inner circumferential surface.

2. The machining assembly as recited in claim 1, wherein the substantially flat annular surface section has a flatness between 0.0002±0.00005 inches.

3. The machining assembly as recited in claim 1, wherein the at least two through-holes are located substantially equidistant from the centerline at a first diameter.

4. The machining assembly as recited in claim 3, wherein the at least two through-holes are a first set of through-holes and the annular body further comprises a second set of at least two through-holes located equidistant from the centerline at a second diameter, the second diameter being greater than the first diameter.

5. The machining assembly as recited in claim 3, wherein the at least two through-holes includes four through-holes spaced circumferentially apart about the centerline at the first diameter.

6. The machining assembly as recited in claim 1, wherein:
each one of the at least two through-holes has a counterbore section extending from the lower axial surface of the annular body and toward the upper axial surface of the annular body, the counterbore section including an annular shoulder surface; and each one of the at least two fasteners includes a threaded rod, the threaded rod being engageable with the separate one of the at least two threaded part openings and having two opposing axial ends of the threaded rod, and a head connected with one of the two opposing axial ends of the threaded rod and disposeable against the annular shoulder surface of one of the at least two through-holes when the threaded rod is engaged with the threaded part opening.

7. The machining assembly as recited in claim 1, wherein the central bore includes a counterbore section extending axially-inwardly from the upper axial surface of the annular body.

8. The machining assembly as recited in claim 1, wherein the annular body further comprises:
at least two mounting holes extending between the upper and lower axial surfaces of the annular body; and
at least two mounting fasteners each disposed within a separate one of the mounting holes and engageable with the pallet to removably couple the annular body with the pallet.

9. The machining as recited in claim 1, wherein the central bore of the annular body has an inside diameter greater than half of an outside dimension of the annular body.

* * * * *